US012497670B2

(12) United States Patent
Kamo et al.

(10) Patent No.: US 12,497,670 B2
(45) Date of Patent: *Dec. 16, 2025

(54) STAINLESS STEEL SEAMLESS PIPE AND METHOD FOR MANUFACTURING STAINLESS STEEL SEAMLESS PIPE

(71) Applicant: JFE Steel Corporation, Tokyo (JP)

(72) Inventors: Yuichi Kamo, Tokyo (JP); Masao Yuga, Tokyo (JP)

(73) Assignee: JFE Steel Corporation, Tokyo (JP)

(*) Notice: Subject to any disclaimer, the term of this patent is extended or adjusted under 35 U.S.C. 154(b) by 528 days.

This patent is subject to a terminal disclaimer.

(21) Appl. No.: 17/910,464

(22) PCT Filed: Mar. 11, 2021

(86) PCT No.: PCT/JP2021/009892
§ 371 (c)(1),
(2) Date: Sep. 9, 2022

(87) PCT Pub. No.: WO2021/187331
PCT Pub. Date: Sep. 23, 2021

(65) Prior Publication Data
US 2023/0048685 A1    Feb. 16, 2023

(30) Foreign Application Priority Data

Mar. 19, 2020  (JP) ................. 2020-048550

(51) Int. Cl.
| | |
|---|---|
| *C21D 9/08* | (2006.01) |
| *C21D 8/10* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/60* | (2006.01) |

(52) U.S. Cl.
CPC ............ *C21D 9/085* (2013.01); *C21D 8/105* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/60* (2013.01); *C21D 2211/001* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 9,783,876 | B2 | 10/2017 | Nakatsuka et al. |
| 11,306,369 | B2 | 4/2022 | Kamo et al. |
| 2012/0031530 | A1 | 2/2012 | Takabe et al. |
| 2015/0152531 | A1 | 6/2015 | Eguchi et al. |
| 2015/0315684 | A1 | 11/2015 | Eguchi et al. |
| 2019/0136337 | A1 | 5/2019 | Eguchi et al. |
| 2019/0292618 | A1 | 9/2019 | Eguchi et al. |
| 2019/0376157 | A1 | 12/2019 | Kamo et al. |
| 2020/0157646 | A1 | 5/2020 | Eguchi et al. |
| 2020/0216936 | A1* | 7/2020 | Kamo .................. C22C 38/02 |
| 2022/0364211 | A1 | 11/2022 | Kamo et al. |
| 2023/0048685 | A1 | 2/2023 | Kamo et al. |
| 2023/0090789 | A1 | 3/2023 | Sasaki et al. |
| 2023/0128437 | A1 | 4/2023 | Eguchi et al. |
| 2023/0137295 | A1 | 5/2023 | Kamo et al. |

FOREIGN PATENT DOCUMENTS

| | | |
|---|---|---|
| CN | 102534418 A | 7/2012 |
| CN | 103938124 A | 7/2014 |
| EP | 3 569 724 A1 | 11/2019 |
| JP | 4415054 B1 | 7/1969 |
| JP | 2015110822 A | 6/2015 |
| JP | 2017-039966 A | 2/2017 |
| WO | 2013146046 A1 | 10/2013 |
| WO | 2017138050 A1 | 8/2017 |
| WO | 2017168874 A1 | 10/2017 |
| WO | 2018020886 A1 | 2/2018 |
| WO | 2018155041 A1 | 8/2018 |
| WO | WO-2019035329 A1 * | 2/2019 .............. C21D 8/10 |

OTHER PUBLICATIONS

Chinese Office Action for Chinese Application No. 202180021073.7, dated Sep. 28, 2023 with Concise Statement of Relevance of Office Action, 9 pages.
The extended European Search Report issued Aug. 23, 2024, by the European Patent Office in corresponding European Patent Application No. 21770456.8-1103. (35, pages).
Chinese Office Action with Search Report for Chinese Application No. 202180021073.7, dated Jul. 14, 2023, 12 pages.
Dehe, "Performance and Structure of Stainless Steel", Machinery Industry Press, (Oct. 31, 1977), pp. 113-115 with English translation, (10 pages).
Office Action (The Third Office Action) issued Dec. 20, 2023, by the State Intellectual Property Office of People's Republic of China in corresponding Chinese Patent Application No. 202180021073.7 and an English translation of the Office Action. (21 pages).

(Continued)

*Primary Examiner* — Brian D Walck
(74) *Attorney, Agent, or Firm* — Buchanan Ingersoll & Rooney PC

(57) ABSTRACT

Provided herein is a stainless steel seamless pipe having a composition that contains, in mass %, C: 0.06% or less, Si: 1.0% or less, Mn: 0.01% or more and 1.0% or less, P: 0.05% or less, S: 0.005% or less, Cr: 15.2% or more and 18.5% or less, Mo: 1.5% or more and 4.3% or less, Cu: 1.1% or more and 3.5% or less, Ni: 3.0% or more and 6.5% or less, Al: 0.10% or less, N: 0.10% or less, O: 0.010% or less, and Sb: 0.001% or more and 1.000% or less, and in which C, Si, Mn, Cr, Ni, Mo, Cu, and N satisfy the predetermined formula, and the balance is Fe and incidental impurities, the stainless steel seamless pipe having a microstructure containing 30% or more martensitic phase, 65% or less ferrite phase, and 40% or less retained austenite phase by volume.

6 Claims, No Drawings

(56) References Cited

OTHER PUBLICATIONS

International Search Report and Written Opinion for International Application No. PCT/JP2021/009892, dated May 25, 2021, 7 pages.
Chinese Office Action for Chinese Application No. 202180021073.7, dated Mar. 12, 2024 with Concise Statement of Relevance of Office Action. (8 pages).
Non Final Office Action for U.S. Appl. No. 17/599,219 mailed Mar. 12, 2024. (10 pages).
Japanese Office Action for Japanese Application No. 2021-533662, dated Apr. 27, 2022 with Concise Statement of Relevance of Office Action, 5 pages.
Office Action issued by the U.S. Patent and Trademark Office in the U.S. Appl. No. 17/910,424, mailed Jun. 2, 2025, U.S. Patent and Trademark Office, Alexandria, VA. (14 pages).

\* cited by examiner

STAINLESS STEEL SEAMLESS PIPE AND METHOD FOR MANUFACTURING STAINLESS STEEL SEAMLESS PIPE

CROSS REFERENCE TO RELATED APPLICATIONS

This is the U.S. National Phase application of PCT/JP2021/009892, filed Mar. 11, 2021 which claims priority to Japanese Patent Application No. 2020-048550, filed Mar. 19, 2020, the disclosures of these applications being incorporated herein by reference in their entireties for all purposes.

FIELD OF THE INVENTION

The present invention relates to a stainless steel seamless pipe suited for oil country tubular goods for oil wells and gas wells (hereinafter, referred to simply as "oil wells"). Particularly, the invention relates to a stainless steel seamless pipe having improved corrosion resistance in various corrosive environments, particularly, severe high-temperature corrosive environments containing carbon dioxide ($CO_2$) and chlorine ions ($Cl^-$), and environments containing hydrogen sulfide ($H_2S$).

BACKGROUND OF THE INVENTION

An expected shortage of energy resources in the near future has prompted active development of oil wells that were unthinkable in the past, for example, such as those in deep oil fields, a carbon dioxide gas-containing environment, and a hydrogen sulfide-containing environment, or a sour environment as it is also called. The steel pipes for oil country tubular goods intended for these environments require high strength and high corrosion resistance.

Oil country tubular goods used for mining of oil fields and gas fields in environments containing $CO_2$, $Cl^-$, and the like typically use 13Cr martensitic stainless steel pipes. There has also been development of oil wells at higher temperatures (a temperature as high as 200° C.). However, the corrosion resistance of 13Cr martensitic stainless steel pipes is not always sufficient for such applications. Accordingly, there is a need for a steel pipe for oil country tubular goods that shows high corrosion resistance even when used in such environments.

In connection with such a demand, for example, PTL 1 describes a stainless steel for oil country tubular goods having a composition that contains, in mass %, C: 0.05% or less, Si: 1.0% or less, Mn: 0.01 to 1.0%, P: 0.05% or less, S: less than 0.002%, Cr: 16 to 18%, Mo: 1.8 to 3%, Cu: 1.0 to 3.5%, Ni: 3.0 to 5.5%, Co: 0.01 to 1.0%, Al: 0.001 to 0.1%, O: 0.05% or less, and N: 0.05% or less, and in which Cr, Ni, Mo, and Cu satisfy specific relationships.

PTL 2 describes a high-strength stainless steel seamless pipe for oil country tubular goods having a composition that contains, in mass %, C: 0.05% or less, Si: 1.0% or less, Mn: 0.1 to 0.5%, P: 0.05% or less, S: less than 0.005%, Cr: more than 15.0% and 19.0% or less, Mo: more than 2.0% and 3.0% or less, Cu: 0.3 to 3.5%, Ni: 3.0% or more and less than 5.0%, W: 0.1 to 3.0%, Nb: 0.07 to 0.5%, V: 0.01 to 0.5%, Al: 0.001 to 0.1%, N: 0.010 to 0.100%, and O: 0.01% or less, and in which Nb, Ta, C, N, and Cu satisfy a specific relationship, and having a microstructure that contains 45% or more tempered martensitic phase, 20 to 40% ferrite phase, and more than 10% and 25% or less retained austenite phase, by volume. It is stated in this related art document that such a high-strength stainless steel seamless pipe for oil country tubular goods can have strength with a yield strength, YS, of 862 MPa or more, and shows sufficient corrosion resistance also in severe high-temperature corrosive environments containing $CO_2$, $Cl^-$, and $H_2S$.

PTL 3 describes a high-strength stainless steel seamless pipe for oil country tubular goods having a composition that contains, in mass %, C: 0.005 to 0.05%, Si: 0.05 to 0.50%, Mn: 0.20 to 1.80%, P: 0.030% or less, S: 0.005% or less, Cr: 14.0 to 17.0%, Ni: 4.0 to 7.0%, Mo: 0.5 to 3.0%, Al: 0.005 to 0.10%, V: 0.005 to 0.20%, Co: 0.01 to 1.0%, N: 0.005 to 0.15%, and O: 0.010% or less, and in which Cr, Ni, Mo, Cu, C, Si, Mn, and N satisfy specific relationships.

PTL 4 describes a high-strength stainless steel seamless pipe for oil country tubular goods having a composition that contains C: 0.05% or less, Si: 0.5% or less, Mn: 0.15 to 1.0%, P: 0.030% or less, S: 0.005% or less, Cr: 14.5 to 17.5%, Ni: 3.0 to 6.0%, Mo: 2.7 to 5.0%, Cu: 0.3 to 4.0%, W: 0.1 to 2.5%, V: 0.02 to 0.20%, Al: 0.10% or less, and N: 0.15% or less, and in which C, Si, Mn, Cr, Ni, Mo, Cu, N, and W satisfy specific relationships, and having a microstructure that contains more than 45% martensitic phase as a primary phase, and 10 to 45% ferrite phase and 30% or less retained austenite phase as secondary phases, by volume. It is stated in this related art document that such a high-strength stainless steel seamless pipe for oil country tubular goods can have strength with a yield strength, YS, of 862 MPa or more, and shows sufficient corrosion resistance also in severe high-temperature corrosive environments containing $CO_2$, $Cl^-$, and $H_2S$.

PTL 5 describes a high-strength stainless steel seamless pipe for oil country tubular goods having a composition that contains, in mass %, C: 0.05% or less, Si: 0.5% or less, Mn: 0.15 to 1.0%, P: 0.030% or less, S: 0.005% or less, Cr: 14.5 to 17.5%, Ni: 3.0 to 6.0%, Mo: 2.7 to 5.0%, Cu: 0.3 to 4.0%, W: 0.1 to 2.5%, V: 0.02 to 0.20%, Al: 0.10% or less, and N: 0.15% or less, and in which C, Si, Mn, Cr, Ni, Mo, Cu, N, and W satisfy specific relationships, and having a microstructure that contains more than 45% martensitic phase as a primary phase, and 10 to 45% ferrite phase and 30% or less retained austenite phase as secondary phases, by volume. It is stated in this related art document that such a high-strength stainless steel seamless pipe for oil country tubular goods can have strength with a yield strength, YS, of 862 MPa or more, and shows sufficient corrosion resistance also in severe high-temperature corrosive environments containing $CO_2$, $Cl^-$, and $H_2S$.

PATENT LITERATURE

PTL 1: WO2013/146046
PTL 2: WO2017/138050
PTL 3: WO2017/168874
PTL 4: WO2018/020886
PTL 5: WO2018/155041

SUMMARY OF THE INVENTION

As discussed above, the development of oil wells in increasingly higher temperature environments has created a demand for high corrosion resistance in steel pipes to be used in such oil wells. A measure of evaluation of corrosion resistance required for steel pipes for oil country tubular goods to be used in oil wells as high as 200° C. is a corrosion rate of 0.127 mm/y or less, measured by immersing a test specimen in a 20 mass % NaCl aqueous solution (solution temperature: 200° C., an atmosphere of 30 atm $CO_2$ gas) for 336 hours.

When steel pipes for oil country tubular goods are to be used in cold climates, desirable low-temperature toughness needs to be satisfied. A measure of evaluation of desirable low-temperature toughness is an absorption energy $vE_{-40}$ of 200 J or more, measured in a Charpy impact test at −40° C.

The stainless steels disclosed in PTL 1, PTL 2, PTL 4, and PTL 5 are described as having high sulfide stress cracking resistance. Specifically, for example, PTL 2 and PTL 4 describe manufacture of steel pipes having improved sulfide stress cracking resistance that does not involve cracking even after a test specimen is immersed in a test solution for 720 hours in an autoclave under an applied stress equal to 90% of the yield stress. (The test solution is an aqueous solution prepared by adding acetic acid and sodium acetate to a 25° C. 20 mass % NaCl aqueous solution in an atmosphere of 0.9 atm $CO_2$ gas and 0.1 atm $H_2S$, and adjusting the pH to 3.5.) In PTL 1, 2, and 4, sulfide stress cracking resistance is determined by the presence or absence of cracking after a round-rod tensile test specimen in compliance with NACE TM0177, Method A is exposed to a specific corrosive environment for 720 hours under an applied stress corresponding to 90% of the actual yield stress (hereinafter, referred to as "constant load test"). In PTL 5, sulfide stress cracking resistance is determined in a similar fashion by subjecting a C-shaped test specimen in compliance with NACE TM0177, Method C to a constant load test under an applied stress corresponding to 100% of the yield stress. Over the last years, the ripple load test (cyclic SSRT or ripple SSRT as it is also called; hereinafter, referred to as "RLT test") has come to be used for evaluation of sulfide stress cracking resistance. The RLT test differs from the constant load test in that, in contrast to the constant load test in which the applied stress is held constant, the RLT test varies the applied stress over the course of testing. Aside from the issues discussed above, enough oil may not be produced when petroleum reservoirs located for extraction of petroleum is of poor quality (most notably, permeability). Oil production also falls below the expected volume in case of accidents such as clogging in the reservoir. Acidizing is a technique that pumps acids such as hydrochloric acid into the reservoir to enhance production. Steel pipes for oil country tubular goods used in such wells need to have desirable corrosion resistance against such acid environments.

PTL 1 to PTL 5 disclose stainless steels having improved corrosion resistance. However, the stainless steels disclosed in these related art documents are not necessarily satisfactory in terms of high-temperature corrosion resistance, sulfide stress cracking resistance, acid-environment corrosion resistance, and low-temperature toughness.

Aspects of the present invention are intended to provide a solution to the problems of the related art, and it is an object according to aspects of the present invention to provide a stainless steel seamless pipe having excellent corrosion resistance and desirable low-temperature toughness while satisfying high strength with a yield strength of 758 MPa (110 ksi) or more.

As used herein, "excellent corrosion resistance" means "excellent carbon dioxide gas corrosion resistance", "excellent sulfide stress cracking resistance", and "excellent acid-environment corrosion resistance"

As used herein, "excellent carbon dioxide gas corrosion resistance" means that a test specimen immersed in a test solution (a 20 mass % NaCl aqueous solution; a liquid temperature of 200° C.; an atmosphere of 30 atm $CO_2$ gas) kept in an autoclave has a corrosion rate of 0.127 mm/y or less after 336 hours in the solution.

As used herein, "excellent sulfide stress cracking resistance" means that a test specimen does not break or crack even after a test (RLT test) that applies stress between 100% and 80% of the yield stress to a test specimen by repeatedly increasing and decreasing applied stress with a strain rate of $1\times10^{-6}$ and a strain rate of $5\times10^{-6}$, respectively, for 1 week in a test solution kept in an autoclave. (The test solution is an aqueous solution prepared by adding acetic acid and sodium acetate to a 25° C. 0.165 mass % NaCl aqueous solution in an atmosphere of 0.99 atm $CO_2$ gas and 0.01 atm $H_2S$, and adjusting the pH to 3.0.) As used herein, "excellent acid-environment corrosion resistance" means a corrosion rate of 600 mm/y or less, as measured when a test specimen is immersed in an 80° C. 15 mass % hydrochloric acid solution for 40 minutes.

As used herein, "desirable low-temperature toughness" means an absorption energy $vE_{-40}$ of 200 J or more, as measured at −40° C. in a Charpy impact test conducted for a V-notch test specimen (10-mm thick) taken from a steel pipe in such an orientation that the longitudinal axis of the test specimen is along the pipe axis, in compliance with the JIS Z 2242 (2018) specifications.

In order to achieve the foregoing objects, the present inventors conducted intensive investigations of various factors that affect the corrosion resistance of stainless steel, particularly the sulfide stress cracking resistance and acid-environment corrosion resistance of stainless steel. The studies found that excellent carbon dioxide gas corrosion resistance, excellent sulfide stress cracking resistance, and excellent acid-environment corrosion resistance can be obtained by adding a predetermined amount or more of Sb, in addition to Cr, Mo, and Cu. It was also found that, in addition to excellent corrosion resistance, desirable low-temperature toughness can be achieved by adding a predetermined amount or more of Ni, and by restraining from excessive addition of Mo.

Aspects of the present invention were completed after further studies based on these findings. Specifically, the gist of aspects of the present invention is as follows.

[1] A stainless steel seamless pipe having a composition that contains, in mass %, C: 0.06% or less, Si: 1.0% or less, Mn: 0.01% or more and 1.0% or less, P: 0.05% or less, S: 0.005% or less, Cr: 15.2% or more and 18.5% or less, Mo: 1.5% or more and 4.3% or less, Cu: 1.1% or more and 3.5% or less, Ni: 3.0% or more and 6.5% or less, Al: 0.10% or less, N: 0.10% or less, O: 0.010% or less, and Sb: 0.001% or more and 1.000% or less, and in which C, Si, Mn, Cr, Ni, Mo, Cu, and N satisfy the following formula (1), and the balance is Fe and incidental impurities, the stainless steel seamless pipe having a microstructure containing 30% or more martensitic phase, 65% or less ferrite phase, and 40% or less retained austenite phase by volume, the stainless steel seamless pipe having a yield strength of 758 MPa or more, $$13.0 \le -5.9\times(7.82+27C-0.91Si+0.21Mn-0.9Cr+Ni-1.1Mo+0.2Cu+11N) \le 55.0 \quad (1),$$

wherein C, Si, Mn, Cr, Ni, Mo, Cu, and N represent the content of each element in mass %, and the content is zero for elements that are not contained.

[2] A stainless steel seamless pipe having a composition that contains, in mass %, C: 0.06% or less, Si: 1.0% or less, Mn: 0.01% or more and 1.0% or less, P: 0.05% or less, S: 0.005% or less, Cr: 15.2% or more and 18.5% or less, Mo: 1.5% or more and 4.3% or less, Cu: 1.1% or more and 3.5% or less, Ni: 3.0% or more and 6.5% or less, Al: 0.10% or less, N: 0.10% or less, O: 0.010% or less, and Sb: 0.001% or more and 1.000% or less, and in which C, Si, Mn, Cr, Ni, Mo, Cu, and N satisfy the following formula (1), and the balance is Fe and incidental impurities, the stainless steel seamless pipe having a microstructure containing 40% or more martensitic phase, 60% or less ferrite phase, and 30% or less retained austenite phase by volume, the stainless steel seamless pipe having a yield strength of 862 MPa or more, $$13.0 \le -5.9 \times (7.82 + 27C - 0.91Si + 0.21Mn - 0.9Cr + Ni - 1.1Mo + 0.2Cu + 11N) \le 55.0 \quad (1),$$

wherein C, Si, Mn, Cr, Ni, Mo, Cu, and N represent the content of each element in mass %, and the content is zero for elements that are not contained.

[3] The stainless steel seamless pipe according to [2], wherein the Cr content is 15.2% or more and 18.0% or less, and the Ni content is 3.0% or more and 6.0% or less, and the composition satisfies the following formula (1)', instead of the formula (1), $$13.0 \le -5.9 \times (7.82 + 27C - 0.91Si + 0.21Mn - 0.9Cr + Ni - 1.1Mo + 0.2Cu + 11N) \le 55.0 \quad (1),$$

wherein C, Si, Mn, Cr, Ni, Mo, Cu, and N represent the content of each element in mass %, and the content is zero for elements that are not contained.

[4] The stainless steel seamless pipe according to any one of [1] to [3], wherein the composition further contains, in mass %, one or two or more groups selected from the following groups A to E, Group A: V: 1.0% or less
Group B: W: 0.9% or less
Group C: one or two selected from Nb: 0.30% or less, and B: 0.01% or less
Group D: one or two or more selected from Ta: 0.3% or less, Co: 1.5% or less, Ti: 0.3% or less, and Zr: 0.3% or less
Group E: one or two or more selected from Ca: 0.01% or less, REM: 0.3% or less, Mg: 0.01% or less, and Sn: 1.0% or less.

[5] A method for manufacturing a stainless steel seamless pipe of any one of [1] to [4],
the method including:
hot working a steel pipe material of said composition into a seamless steel pipe;
quenching that reheats the seamless steel pipe to a temperature of 850 to 1,150° C., and cools the seamless steel pipe at a cooling rate of air cooling or faster until a pipe surface reaches a cooling stop temperature of 50° C. or less; and
tempering that heats the quenched seamless steel pipe to a temperature of 500 to 650° C.

Aspects of the present invention can provide a stainless steel seamless pipe having high strength with a yield strength of 758 MPa (110 ksi) or more, having excellent corrosion resistance and desirable low-temperature toughness.

DETAILED DESCRIPTION OF EMBODIMENTS OF THE INVENTION

Embodiments of the present invention are described below in detail.

A stainless steel seamless pipe according to aspects of the present invention has a composition that contains, in mass %, C: 0.06% or less, Si: 1.0% or less, Mn: 0.01% or more and 1.0% or less, P: 0.05% or less, S: 0.005% or less, Cr: 15.2% or more and 18.5% or less, Mo: 1.5% or more and 4.3% or less, Cu: 1.1% or more and 3.5% or less, Ni: 3.0% or more and 6.5% or less, Al: 0.10% or less, N: 0.10% or less, O: 0.010% or less, and Sb: 0.001% or more and 1.000% or less, and in which C, Si, Mn, Cr, Ni, Mo, Cu, and N satisfy the following formula (1), and the balance is Fe and incidental impurities, the stainless steel seamless pipe having a microstructure containing 30% or more martensitic phase, 65% or less ferrite phase, and 40% or less retained austenite phase by volume, the stainless steel seamless pipe having a yield strength of 758 MPa or more, $$13.0 \le -5.9 \times (7.82 + 27C - 0.91Si + 0.21Mn - 0.9Cr + Ni - 1.1Mo + 0.2Cu + 11N) \le 55.0 \quad (1),$$

wherein C, Si, Mn, Cr, Ni, Mo, Cu, and N represent the content of each element in mass %, and the content is zero for elements that are not contained.

The following describes the reasons for specifying the composition of a stainless steel seamless pipe according to aspects of the present invention. In the following, "%" means percent by mass, unless otherwise specifically stated.

C: 0.06% or Less

C is an element that becomes incidentally included in the process of steelmaking. Corrosion resistance decreases when C is contained in an amount of more than 0.06%. For this reason, the C content is 0.06% or less. The C content is preferably 0.05% or less, more preferably 0.04% or less, even more preferably 0.03% or less. Considering the decarburization cost, the lower limit of C content is preferably 0.002%, more preferably 0.003% or more, even more preferably 0.005% or more.

Si: 1.0% or Less

Si is an element that acts as a deoxidizing agent. However, hot workability and corrosion resistance decrease when Si is contained in an amount of more than 1.0%. For this reason, the Si content is 1.0% or less. The Si content is preferably 0.7% or less, more preferably 0.5% or less, even more preferably 0.4% or less. It is not particularly required to set a lower limit, as long as the deoxidizing effect is obtained. However, in order to obtain a sufficient deoxidizing effect, the Si content is preferably 0.03% or more, more preferably 0.05% or more, even more preferably 0.1% or more.

Mn: 0.01% or More and 1.0% or Less

Mn is an element that acts as a deoxidizing agent and a desulfurizing agent, and that improves hot workability. Mn is contained in an amount of 0.01% or more to obtain the deoxidizing and desulfurizing effects, and to improve strength. The effects become saturated with a Mn content of more than 1.0%. For this reason, the Mn content is 0.01% or more and 1.0% or less. The Mn content is preferably 0.03% or more, more preferably 0.05% or more, even more preferably 0.1% or more. The Mn content is preferably 0.8% or less, more preferably 0.6% or less, even more preferably 0.4% or less.

P: 0.05% or Less

P is an element that impairs carbon dioxide gas corrosion resistance and sulfide stress cracking resistance. P is therefore contained preferably in as small an amount as possible in accordance with aspects of the present invention. However, a P content of 0.05% or less is acceptable. For this reason, the P content is 0.05% or less. The P content is preferably 0.04% or less, more preferably 0.03% or less.

S: 0.005% or Less

S is an element that seriously impairs hot workability, and interferes with stable operations of hot working in the pipe manufacturing process. S exists as sulfide inclusions in steel, and impairs corrosion resistance. S should therefore be contained preferably in as small an amount as possible. However, a S content of 0.005% or less is acceptable. For this reason, the S content is 0.005% or less. The S content is preferably 0.004% or less, more preferably 0.003% or less, even more preferably 0.002% or less.

Cr: 15.2% or More and 18.5% or Less

Cr is an element that forms a protective coating on steel pipe surface, and contributes to improving corrosion resistance. The desired carbon dioxide gas corrosion resistance and the desired sulfide stress cracking resistance cannot be obtained when the Cr content is less than 15.2%. For this reason, Cr needs to be contained in an amount of 15.2% or more. With a Cr content of more than 18.5%, the ferrite fraction overly increases, and the desired strength cannot be provided. For this reason, the Cr content is 15.2% or more and 18.5% or less. The Cr content is preferably 15.5% or more, more preferably 16.0% or more, even more preferably 16.30% or more. The Cr content is preferably 18.0% or less, more preferably 17.5% or less, even more preferably 17.0% or less.

Mo: 1.5% or More and 4.3% or Less

By stabilizing the protective coating on steel pipe surface, Mo increases the resistance against pitting corrosion due to Cl⁻ and low pH, and increases carbon dioxide gas corrosion resistance and sulfide stress cracking resistance. Mo needs to be contained in an amount of 1.5% or more to obtain the desired corrosion resistance. The toughness (low-temperature toughness) decreases with a Mo content of more than 4.3%. For this reason, the Mo content is 1.5% or more and 4.3% or less. The Mo content is preferably 1.8% or more, more preferably 2.0% or more, even more preferably 2.3% or more. The Mo content is preferably 4.0% or less, more preferably 3.5% or less, even more preferably 3.0% or less.

Cu: 1.1% or More and 3.5% or Less

Cu has the effect to strengthen the protective coating on steel pipe surface, and improve carbon dioxide gas corrosion resistance and sulfide stress cracking resistance. Cu needs to be contained in an amount of 1.1% or more to obtain the desired strength and corrosion resistance, particularly, carbon dioxide gas corrosion resistance. An excessively high Cu content results in decrease of hot workability of steel, and the Cu content is 3.5% or less. For this reason, the Cu content is 1.1% or more and 3.5% or less. The Cu content is preferably 1.8% or more, more preferably 2.0% or more, even more preferably 2.3% or more. The Cu content is preferably 3.2% or less, more preferably 3.0% or less, even more preferably 2.7% or less.

Ni: 3.0% or More and 6.5% or Less

Ni strengthens the strength of steel by solid solution strengthening, and improves the toughness (low-temperature toughness) of steel. A Ni content of 3.0% or more is needed to obtain the desired toughness (low-temperature toughness). A Ni content of more than 6.5% results in stability of martensitic phase decrease, and the strength decreases. For this reason, the Ni content is 3.0% or more and 6.5% or less. The Ni content is preferably 3.8% or more, more preferably 4.0% or more, even more preferably 4.5% or more. The Ni content is preferably 6.0% or less, more preferably 5.5% or less, even more preferably 5.2% or less.

Al: 0.10% or Less

Al is an element that acts as a deoxidizing agent. However, corrosion resistance decreases when Al is contained in an amount of more than 0.10%. For this reason, the Al content is 0.10% or less. The Al content is preferably 0.07% or less, more preferably 0.05% or less. It is not particularly required to set a lower limit, as long as the deoxidizing effect is obtained. However, in order to obtain a sufficient deoxidizing effect, the Al content is preferably 0.005% or more, more preferably 0.01% or more, even more preferably 0.015% or more.

N: 0.10% or Less

N is an element that becomes incidentally included in the process of steelmaking. N is also an element that increases the steel strength. However, when contained in an amount of more than 0.10%, N forms nitrides, and decreases the corrosion resistance. For this reason, the N content is 0.10% or less. The N content is preferably 0.08% or less, more preferably 0.07% or less, even more preferably 0.05% or less. The N content does not have a specific lower limit. However, an excessively low N content leads to increased steelmaking costs. For this reason, the N content is preferably 0.002% or more, more preferably 0.003% or more, even more preferably 0.005% or more.

O: 0.010% or Less

O (oxygen) exists as an oxide in steel, and causes adverse effects on various properties. For this reason, 0 is contained preferably in as small an amount as possible in accordance with aspects of the present invention. An 0 content of more than 0.010% results in decrease of hot workability and corrosion resistance. For this reason, the 0 content is 0.010% or less.

Sb: 0.001% or More and 1.000% or Less

Sb improves corrosion resistance, particularly sulfide stress cracking resistance. This makes Sb an important element in accordance with aspects of the present invention. Sb is contained in an amount of 0.001% or more to obtain the desired corrosion resistance. The effect becomes saturated with a Sb content of more than 1.000%. For this reason, the Sb content is 0.001% or more and 1.000% or less in accordance with aspects of the present invention. The Sb content is preferably 0.005% or more, more preferably 0.01% or more, even more preferably 0.02% or more. The Sb content is preferably 0.5% or less, more preferably 0.3% or less, even more preferably 0.1% or less.

In accordance with aspects of the present invention, C, Si, Mn, Cr, Ni, Mo, Cu, and N are contained so as to satisfy the following formula (1), in addition to satisfying the foregoing composition.

$$13.0 \leq -5.9 \times (7.82 + 27C - 0.91Si + 0.21Mn - 0.9Cr + Ni - 1.1Mo + 0.2Cu + 11N) \leq 55.0 \quad (1),$$

In the formula, C, Si, Mn, Cr, Ni, Mo, Cu, and N represent the content of each element in mass %, and the content is 0 (zero) for elements that are not contained.

In formula (1), the expression $-5.9 \times (7.82 + 27C - 0.91Si + 0.21Mn - 0.9Cr + Ni - 1.1Mo + 0.2Cu + 11N)$ (hereinafter, referred to also as "middle polynomial of formula (1)", or, simply, "middle value") is determined as an index that indicates the likelihood of ferrite phase formation. With the alloy elements indicated in formula (1) contained in and adjusted so as to satisfy formula (1), it is possible to stably produce a composite microstructure of martensitic phase and ferrite phase, or a composite microstructure of martensitic phase, ferrite phase, and retained austenite phase. When any of the alloy elements occurring in formula (1) is not contained, the value of the middle polynomial of formula (1) is calculated by regarding the content of such an element as zero percent.

When the value of the middle polynomial of formula (1) is less than 13.0, the ferrite phase decreases, and the manufacturing yield decreases. On the other hand, when the value of the middle polynomial of formula (1) is more than 55.0, the ferrite phase becomes more than 65% by volume, and the desired strength cannot be provided. For this reason, the formula (1) specified in accordance with aspects of the present invention sets a left-hand value of 13.0 as the lower limit, and a right-hand value of 55.0 as the upper limit.

The lower-limit left-hand value of the formula (1) specified in accordance with aspects of the present invention is preferably 15.0, more preferably 20.0, even more preferably 23.0. The right-hand value is preferably 50.0, more preferably 45.0, even more preferably 40.0.

That is, the middle polynomial of formula (1) has a value of 13.0 or more and 55.0 or less. Preferably, the middle polynomial has a value of 13.0 or more and 50.0 or less, as represented by the formula (1)' below. The value of middle polynomial is more preferably 15.0 or more and 45.0 or less, even more preferably 20.0 or more and 40.0 or less, yet more preferably 23.0 or more and 40.0 or less.

$$13.0 \leq -5.9 \times (7.82 + 27C - 0.91Si + 0.21Mn - 0.9Cr + Ni - 1.1Mo + 0.2Cu + 11N) \leq 50.0 \quad (1)'$$

In the formula, C, Si, Mn, Cr, Ni, Mo, Cu, and N represent the content of each element in mass %, and the content is 0 (zero) for elements that are not contained.

In accordance with aspects of the present invention, the balance in the composition above is Fe and incidental impurities.

A stainless steel seamless pipe according to aspects of the present invention can provide the desired characteristics by containing the essential elements described above. In accordance with aspects of the present invention, for further improvement of characteristics, the composition may further contain one or two or more optional elements (V, W, Nb, B, Ta, Co, Ti, Zr, Ca, REM, Mg, and Sn), as required, in addition to the foregoing basic components, as follows.

Specifically, in accordance with aspects of the present invention, the composition may additionally contain V: 1.0% or less.

In accordance with aspects of the present invention, the composition may additionally contain W: 0.9% or less.

In accordance with aspects of the present invention, the composition may additionally contain one or two selected from Nb: 0.30% or less, and B: 0.01% or less.

In accordance with aspects of the present invention, the composition may additionally contain one or two or more selected from Ta: 0.3% or less, Co: 1.5% or less, Ti: 0.3% or less, and Zr: 0.3% or less.

In accordance with aspects of the present invention, the composition may additionally contain one or two or more selected from Ca: 0.01% or less, REM: 0.3% or less, Mg: 0.01% or less, and Sn: 1.0% or less.

V: 1.0% or Less

V, an optional element, is an element that increases strength. The effect becomes saturated with a V content of more than 1.0%. For this reason, V, when contained, is contained in an amount of preferably 1.0% or less. The V content is more preferably 0.5% or less, even more preferably 0.3% or less. The V content is more preferably 0.01% or more, even more preferably 0.03% or more.

W: 0.9% or Less

W is an element that contributes to improving steel strength, and that can increase carbon dioxide gas corrosion resistance and sulfide stress cracking resistance by stabilizing the protective coating on steel pipe surface. W greatly improves corrosion resistance when contained with Mo. As an optional element, W may be contained to obtain these effects. The toughness (low-temperature toughness) decreases when the W content is more than 0.9%. For this reason, W, when contained, is contained in an amount of preferably 0.9% or less. The W content is more preferably 0.50% or less, even more preferably 0.3% or less. When W is contained, the W content is more preferably 0.05% or more, even more preferably 0.10% or more.

Nb: 0.30% or Less

Nb, an optional element, is an element that increases steel strength, and that improves corrosion resistance. The effects become saturated with a Nb content of more than 0.30%. For this reason, Nb, when contained, is contained in an amount of preferably 0.30% or less. The Nb content is more preferably 0.20% or less, even more preferably 0.15% or less. The Nb content is more preferably 0.03% or more, even more preferably 0.05% or more.

B: 0.01% or Less

B, an optional element, is an element that increases strength. B also contributes to improving hot workability, and has the effect to reduce fracture and cracking during the pipe making process. On the other hand, a B content of more than 0.01% produces hardly any hot workability improving effect, and results in decrease of low-temperature toughness. For this reason, B, when contained, is contained in an amount of preferably 0.01% or less. The B content is more preferably 0.008% or less, even more preferably 0.007% or less. The B content is more preferably 0.0005% or more, even more preferably 0.001% or more.

Ta: 0.3% or Less

Ta, an optional element, is an element that increases strength, and that improves corrosion resistance. Ta is contained in an amount of preferably 0.001% or more to obtain these effects. With a Ta content of more than 0.3%, the effects become saturated. For this reason, Ta, when contained, is contained in a limited amount of preferably 0.3% or less. The Ta content is more preferably 0.1% or less. The Ta content is more preferably 0.040% or less.

Co: 1.5% or Less

Co, an optional element, is an element that increases strength. Co also has the effect to improve corrosion resistance, in addition to increasing strength. Co is contained in an amount of preferably 0.0005% or more to obtain these effects. The Co content is more preferably 0.005% or more, even more preferably 0.010% or more. The effects become saturated with a Co content of more than 1.5%. For this reason, Co, when contained, is contained in a limited amount of preferably 1.5% or less. The Co content is more preferably 1.0% or less.

Ti: 0.3% or Less

Ti, an optional element, is an element that increases strength. Ti is contained in an amount of preferably 0.0005% or more to obtain this effect. The toughness (low-temperature toughness) decreases when the Ti content is more than 0.3%. For this reason, Ti, when contained, is contained in a limited amount of 0.3% or less. The Ti content is more preferably 0.1% or less, and is more preferably 0.001% or more.

Zr: 0.3% or Less

Zr, an optional element, is an element that increases strength. Zr also has the effect to improve sulfide stress cracking resistance, in addition to increasing strength. In order to obtain these effects, Zr is contained in an amount of preferably 0.0005% or more. The effect becomes saturated with a Zr content of more than 0.3%. For this reason, Zr, when contained, is contained in a limited amount of preferably 0.3% or less.

Ca: 0.01% or Less

Ca, an optional element, is an element that contributes to improving sulfide stress corrosion cracking resistance by controlling the shape of sulfide. In order to obtain this effect, Ca is contained in an amount of preferably 0.0005% or more. When Ca is contained in an amount of more than 0.01%, the effect becomes saturated, and Ca cannot produce the effect expected from the increased content. For this reason, Ca, when contained, is contained in a limited amount of preferably 0.01% or less. The Ca content is more preferably 0.007% or less, and is more preferably 0.005% or more.

REM: 0.3% or Less

REM (rare-earth metal), an optional element, is an element that contributes to improving sulfide stress corrosion cracking resistance by controlling the shape of sulfide. In order to obtain this effect, REM is contained in an amount of preferably 0.0005% or more. When REM is contained in an amount of more than 0.3%, the effect becomes saturated, and REM cannot produce the effect expected from the increased content. For this reason, REM, when contained, is contained in a limited amount of preferably 0.3% or less.

As used herein, "REM" means scandium (Sc; atomic number 21) and yttrium (Y; atomic number 39), as well as lanthanoids from lanthanum (La; atomic number 57) to lutetium (Lu; atomic number 71). As used herein, "REM concentration" means the total content of one or two or more elements selected from the foregoing REM elements.

Mg: 0.01% or Less

Mg, an optional element, is an element that improves corrosion resistance. In order to obtain this effect, Mg is contained in an amount of preferably 0.0005% or more. When Mg is contained in an amount of more than 0.01%, the effect becomes saturated, and Mg cannot produce the effect expected from the increased content. For this reason, Mg, when contained, is contained in a limited amount of preferably 0.01% or less.

Sn: 1.0% or Less

Sn, an optional element, is an element that improves corrosion resistance. In order to obtain this effect, Sn is contained in an amount of preferably 0.001% or more. When Sn is contained in an amount of more than 1.0%, the effect becomes saturated, and Sn cannot produce the effect expected from the increased content. For this reason, Sn, when contained, is contained in a limited amount of preferably 1.0% or less.

The following describes the reason for limiting the microstructure in the stainless steel seamless pipe according to aspects of the present invention.

In addition to having the foregoing composition, the stainless steel seamless pipe according to aspects of the present invention has a microstructure that contains 30% or more martensitic phase, 65% or less ferrite phase, and 40% or less retained austenite phase by volume.

In order to provide the desired strength, the stainless steel seamless pipe according to aspects of the present invention contains 30% or more martensitic phase by volume. The martensitic phase is preferably 40% or more, more preferably 45% or more. The martensitic phase is preferably 70% or less, more preferably 65% or less.

The stainless steel seamless pipe according to aspects of the present invention contains 65% or less ferrite phase by volume. With the ferrite phase, propagation of sulfide stress corrosion cracking and sulfide stress cracking can be reduced, and excellent corrosion resistance can be obtained. If the ferrite phase is more than 65% by volume, and precipitates in large amounts, it might not be possible to provide the desired strength. The ferrite phase is preferably 5% or more by volume, more preferably 10% or more, even more preferably 20% or more. The ferrite phase is preferably 60% or less by volume, more preferably 50% or less, even more preferably 45% or less.

The stainless steel seamless pipe according to aspects of the present invention contains 40% or less austenitic phase (retained austenite phase) by volume, in addition to the martensitic phase and the ferrite phase. Ductility and toughness (low-temperature toughness) improve by the presence of the retained austenite phase. If the austenitic phase is more than 40% by volume, and precipitates in large amounts, it is not possible to provide the desired strength. For this reason, the retained austenite phase is 40% or less by volume. The retained austenite phase is preferably 5% or more by volume. The retained austenite phase is preferably 30% or less by volume. The retained austenite phase is more preferably 10% or more, and is more preferably 25% or less.

The microstructure of the stainless steel seamless pipe according to aspects of the present invention can be measured as follows. First, a test specimen for microstructure observation is corroded with a Vilella's reagent (a mixed reagent containing at a rate of 2 g of picric acid, 10 ml of hydrochloric acid, and 100 ml of ethanol), and the structure is imaged with a scanning electron microscope (1,000 times magnification). The fraction of the ferrite phase microstructure (area ratio (%)) is then calculated with an image analyzer. The area ratio is defined as the volume ratio (%) of the ferrite phase.

Separately, an X-ray diffraction test specimen is ground and polished to have a measurement cross section (C cross section) orthogonal to the axial direction of pipe, and the fraction of the retained austenite (γ) phase microstructure is measured by an X-ray diffraction method. The fraction of the retained austenite phase microstructure is determined by measuring X-ray diffraction integral intensity for the (220) plane of the austenite phase (γ), and the (211) plane of the ferrite phase (α), and converting the calculated values using the following formula.

$$\gamma(\text{volume ratio}) = 100/(1+(I\alpha R\gamma/I\gamma R\alpha)),$$

wherein $I\alpha$ is the integral intensity of $\alpha$, $R\alpha$ is the crystallographic theoretical value for $\alpha$, $I\gamma$ is the integral intensity of $\gamma$, and $R\gamma$ is the crystallographic theoretical value for $\gamma$.

The fraction of the martensitic phase is the remainder other than the fractions of the ferrite phase and retained γ phase determined by the foregoing measurement method. The method of microstructure observation will also be described in detail in the Examples section below.

The following describes a preferred method for manufacturing a stainless steel seamless pipe according to aspects of the present invention.

Preferably, a molten steel of the foregoing composition is made using a common steelmaking process such as by using a converter, and formed into a steel pipe material, for example, a billet, using an ordinary method such as continuous casting, or ingot casting-billeting. The steel pipe material before hot working is heated at a temperature of preferably 1,100 to 1,350° C. In this way, the final product can satisfy the desired low-temperature toughness while ensuring hot workability in pipe making. The steel pipe material is then hot worked into a pipe using a known pipe manufacturing process, for example, the Mannesmann-plug mill process or the Mannesmann-mandrel mill process, to produce a seamless steel pipe of desired dimensions having the foregoing composition. The hot working may be followed by cooling. The cooling process (cooling step) is not particularly limited. After the hot working, the pipe is cooled to preferably room temperature at a cooling rate about the same as air cooling, provided that the composition falls in the range according to aspects of the present invention.

In accordance with aspects of the present invention, the seamless steel pipe so obtained is subjected to a heat treatment that includes quenching and tempering.

In quenching, the steel pipe is reheated to a temperature of 850 to 1,150° C., and cooled at a cooling rate of air cooling or faster. The cooling stop temperature is 50° C. or less in terms of a surface temperature of the seamless steel pipe.

When the heating temperature (quenching temperature) is less than 850° C., a reverse transformation from martensite to austenite does not occur, and the austenite does not transform into martensite during cooling, with the result that the desired strength cannot be provided. On the other hand, the crystal grains coarsen when the heating temperature (quenching temperature) exceeds 1,150° C. For this reason, the heating temperature of quenching is 850 to 1,150° C. The heating temperature of quenching is preferably 900° C. or more. The heating temperature of quenching is preferably 1,100° C. or less. When the cooling stop temperature is more than 50° C., the austenite does not sufficiently transform into martensite, and the fraction of retained austenite becomes overly high. For this reason, the cooling stop temperature of the cooling in quenching is 50° C. or less in accordance with aspects of the present invention. Here, "cooling rate of air cooling or faster" means 0.01° C./s or more.

In quenching, the soaking time (quenching time) is preferably 5 to 30 minutes, in order to achieve a uniform temperature along a wall thickness direction, and prevent variation in the material.

In tempering, the quenched seamless steel pipe is heated to a tempering temperature of 500 to 650° C. The heating may be followed by natural cooling.

A tempering temperature of less than 500° C. is too low to produce the desired tempering effect as intended. When the tempering temperature is higher than 650° C., precipitation of intermetallic compounds occurs, and it is not possible to obtain desirable low-temperature toughness. For this reason, the tempering temperature is 500 to 650° C. The tempering temperature is preferably 520° C. or more. The tempering temperature is preferably 630° C. or less.

In tempering, the retention time (tempering time) is preferably 5 to 90 minutes, in order to achieve a uniform temperature along a wall thickness direction, and prevent variation in the material properties.

After the heat treatment (quenching and tempering), the seamless steel pipe has a microstructure in which the martensitic phase, the ferrite phase, and the retained austenite phase are contained in a specific predetermined volume ratio. In this way, the stainless steel seamless pipe can have the desired strength and excellent corrosion resistance.

The stainless steel seamless pipe obtained in accordance with aspects of the present invention in the manner described above is a high-strength steel pipe having a yield strength of 758 MPa or more, and has excellent corrosion resistance. Preferably, the yield strength is 862 MPa (125 ksi) or more. Preferably, the yield strength is 1,034 MPa or less. The stainless steel seamless pipe according to aspects of the present invention can be used as a stainless steel seamless pipe for oil country tubular goods (a high-strength stainless steel seamless pipe for oil country tubular goods).

Examples

Aspects of the present invention are further described below through Examples. It is to be noted that the present invention is not limited by the following Examples.

Molten steels of the compositions shown in Table 1-1 and Table 1-2 were cast into steel pipe materials. The steel pipe material was heated, and hot worked into a seamless steel pipe measuring 83.8 mm in outer diameter and 12.7 mm in wall thickness, using a model seamless rolling mill. The seamless steel pipe was then cooled by air cooling. The heating of the steel pipe material before hot working was carried out at a heating temperature of 1,250° C.

Each seamless steel pipe was cut into a test specimen material, which was then subjected to quenching that included reheating to the quenching temperatures shown in Table 2-1 and Table 2-2, and cooling (water cooling) to a cooling stop temperature of 30° C. after the quenching retention time shown in Table 2-1 and Table 2-2. This was followed by tempering that included heating to the tempering temperatures shown in Table 2-1 and Table 2-2, and air cooling after the tempering retention time shown in Table 2-1 and Table 2-2. In quenching, the water cooling was carried out at a cooling rate of 11° C./s. The air cooling (natural cooling) in tempering was carried out at a cooling rate of 0.04° C./s. In Table 1-1 and Table 1-2, the blank cells indicate that elements were not intentionally added, meaning that elements may be absent (0%), or may be incidentally present.

TABLE 1-1

| Steel No. | Composition (mass %) | | | | | | | | | | |
|---|---|---|---|---|---|---|---|---|---|---|---|
| | C | Si | Mn | P | S | Cr | Mo | Cu | Ni | Al | N |
| A | 0.017 | 0.36 | 0.261 | 0.012 | 0.0009 | 17.03 | 2.77 | 2.15 | 4.87 | 0.026 | 0.020 |
| B | 0.010 | 0.26 | 0.331 | 0.019 | 0.0010 | 16.98 | 2.47 | 2.77 | 4.15 | 0.022 | 0.019 |
| C | 0.013 | 0.28 | 0.384 | 0.018 | 0.0013 | 17.26 | 2.75 | 3.26 | 4.99 | 0.027 | 0.017 |
| D | 0.059 | 0.30 | 0.271 | 0.014 | 0.0012 | 17.40 | 2.41 | 2.43 | 5.28 | 0.027 | 0.020 |
| E | 0.018 | 0.92 | 0.221 | 0.016 | 0.0015 | 16.49 | 2.54 | 2.82 | 5.14 | 0.026 | 0.010 |
| F | 0.011 | 0.33 | 0.937 | 0.017 | 0.0012 | 16.96 | 2.39 | 1.86 | 4.14 | 0.027 | 0.012 |
| G | 0.011 | 0.25 | 0.023 | 0.017 | 0.0010 | 16.62 | 2.61 | 3.23 | 4.23 | 0.025 | 0.015 |
| H | 0.008 | 0.32 | 0.148 | 0.049 | 0.0015 | 16.80 | 2.35 | 3.05 | 4.50 | 0.023 | 0.018 |
| I | 0.010 | 0.31 | 0.190 | 0.019 | 0.0041 | 16.74 | 2.48 | 1.85 | 4.95 | 0.025 | 0.016 |
| J | 0.014 | 0.26 | 0.283 | 0.015 | 0.0015 | 17.95 | 2.53 | 2.80 | 4.75 | 0.025 | 0.011 |
| K | 0.013 | 0.32 | 0.310 | 0.016 | 0.0014 | 15.32 | 2.56 | 1.86 | 5.39 | 0.029 | 0.022 |
| L | 0.008 | 0.29 | 0.203 | 0.014 | 0.0011 | 17.04 | 4.17 | 3.18 | 4.79 | 0.026 | 0.015 |
| M | 0.009 | 0.32 | 0.183 | 0.014 | 0.0010 | 17.32 | 1.66 | 2.68 | 4.53 | 0.027 | 0.022 |

TABLE 1-1-continued

| | | | | | | | | | | |
|---|---|---|---|---|---|---|---|---|---|---|
| N | 0.011 | 0.30 | 0.234 | 0.013 | 0.0015 | 16.70 | 2.90 | 3.38 | 4.20 | 0.024 | 0.018 |
| O | 0.017 | 0.23 | 0.374 | 0.015 | 0.0012 | 16.74 | 2.33 | 1.28 | 4.27 | 0.026 | 0.012 |
| P | 0.012 | 0.36 | 0.171 | 0.016 | 0.0010 | 16.93 | 2.53 | 2.75 | 5.86 | 0.023 | 0.012 |
| Q | 0.014 | 0.30 | 0.261 | 0.015 | 0.0009 | 16.91 | 3.27 | 2.26 | 3.14 | 0.026 | 0.018 |
| T | 0.015 | 0.29 | 0.374 | 0.016 | 0.0010 | 16.54 | 3.00 | 2.78 | 4.53 | 0.089 | 0.013 |
| U | 0.018 | 0.29 | 0.259 | 0.015 | 0.0010 | 16.80 | 2.32 | 2.80 | 5.09 | 0.025 | 0.075 |
| V | 0.011 | 0.31 | 0.206 | 0.014 | 0.0008 | 16.96 | 2.48 | 3.16 | 5.38 | 0.024 | 0.015 |
| W | 0.011 | 0.27 | 0.333 | 0.015 | 0.0008 | 16.76 | 2.23 | 2.07 | 5.51 | 0.024 | 0.014 |
| X | 0.010 | 0.32 | 0.258 | 0.015 | 0.0011 | 16.77 | 2.36 | 1.92 | 5.46 | 0.026 | 0.017 |
| Y | 0.002 | 0.90 | 0.267 | 0.015 | 0.0010 | 17.59 | 4.01 | 1.82 | 4.29 | 0.018 | 0.006 |
| Z | 0.034 | 0.06 | 0.426 | 0.015 | 0.0008 | 16.01 | 1.79 | 2.65 | 4.72 | 0.027 | 0.007 |
| AA | 0.005 | 0.30 | 0.380 | 0.016 | 0.0010 | 16.63 | 2.54 | 2.88 | 5.22 | 0.026 | 0.017 |
| AB | 0.008 | 0.29 | 0.253 | 0.016 | 0.0013 | 16.55 | 2.55 | 1.81 | 4.46 | 0.022 | 0.017 |
| AC | 0.009 | 0.24 | 0.240 | 0.013 | 0.0014 | 16.70 | 2.53 | 3.00 | 4.11 | 0.027 | 0.020 |
| AD | 0.012 | 0.35 | 0.288 | 0.017 | 0.0009 | 17.02 | 2.80 | 1.87 | 5.47 | 0.026 | 0.020 |
| AE | 0.014 | 0.23 | 0.374 | 0.014 | 0.0011 | 17.32 | 3.23 | 3.07 | 4.22 | 0.028 | 0.015 |
| AF | 0.013 | 0.30 | 0.160 | 0.017 | 0.0007 | 17.01 | 2.58 | 3.19 | 4.56 | 0.027 | 0.015 |
| AG | 0.010 | 0.30 | 0.381 | 0.015 | 0.0014 | 16.93 | 2.36 | 2.39 | 4.15 | 0.027 | 0.014 |
| AH | 0.012 | 0.30 | 0.282 | 0.015 | 0.0012 | 16.44 | 2.86 | 2.79 | 4.83 | 0.027 | 0.016 |
| AI | 0.008 | 0.36 | 0.150 | 0.016 | 0.0006 | 16.52 | 3.24 | 3.18 | 4.82 | 0.025 | 0.011 |
| AJ | 0.014 | 0.27 | 0.265 | 0.016 | 0.0008 | 16.96 | 3.11 | 2.76 | 4.54 | 0.024 | 0.011 |
| AK | 0.011 | 0.28 | 0.247 | 0.016 | 0.0012 | 16.64 | 2.47 | 3.12 | 5.31 | 0.028 | 0.015 |

| Steel No. | Composition (mass %) | | | Formula (1) (*3) Middle value | Result | Remarks |
|---|---|---|---|---|---|---|
| | O | Sb | Other | | | |
| A | 0.001 | 0.0179 | | 28.6 | ○ | Present Steel |
| B | 0.002 | 0.0980 | | 30.5 | ○ | Present Steel |
| C | 0.002 | 0.0633 | | 27.9 | ○ | Present Steel |
| D | 0.003 | 0.0652 | | 18.5 | ○ | Present Steel |
| E | 0.003 | 0.0868 | | 25.4 | ○ | Present Steel |
| F | 0.002 | 0.0339 | | 30.9 | ○ | Present Steel |
| G | 0.001 | 0.0629 | | 28.9 | ○ | Present Steel |
| H | 0.001 | 0.0644 | | 27.3 | ○ | Present Steel |
| I | 0.004 | 0.0894 | | 26.3 | ○ | Present Steel |
| J | 0.004 | 0.0080 | | 32.4 | ○ | Present Steel |
| K | 0.002 | 0.0932 | | 15.7 | ○ | Present Steel |
| L | 0.004 | 0.0666 | | 38.5 | ○ | Present Steel |
| M | 0.004 | 0.0589 | | 25.3 | ○ | Present Steel |
| N | 0.001 | 0.0976 | | 31.0 | ○ | Present Steel |
| O | 0.003 | 0.0500 | | 28.5 | ○ | Present Steel |
| P | 0.004 | 0.0181 | | 21.4 | ○ | Present Steel |
| Q | 0.002 | 0.0473 | | 41.6 | ○ | Present Steel |
| T | 0.004 | 0.1161 | | 29.0 | ○ | Present Steel |
| U | 0.003 | 0.0634 | | 18.3 | ○ | Present Steel |
| V | 0.009 | 0.1096 | | 23.2 | ○ | Present Steel |
| W | 0.002 | 0.9084 | | 20.8 | ○ | Present Steel |
| X | 0.002 | 0.0022 | | 22.4 | ○ | Present Steel |
| Y | 0.001 | 0.0512 | | 49.6 | ○ | Present Steel |
| Z | 0.003 | 0.0336 | | 13.4 | ○ | Present Steel |
| AA | 0.001 | 0.0143 | V: 0.06 | 23.7 | ○ | Present Steel |

TABLE 1-1-continued

| | | | | | | |
|---|---|---|---|---|---|---|
| AB | 0.002 | 0.0348 | W: 0.25 | 28.7 | o | Present Steel |
| AC | 0.003 | 0.0706 | Nb: 0.11, B: 0.003 | 29.4 | o | Present Steel |
| AD | 0.002 | 0.0727 | Ta: 0.25, Co: 1.30, Ti: 0.22, Zr: 0.24 | 26.2 | o | Present Steel |
| AE | 0.003 | 0.1079 | Ca: 0.009, REM: 0.22, Mg: 0.005, Sn: 0.95 | 35.8 | o | Present Steel |
| AF | 0.003 | 0.1098 | V: 0.07, W: 0.47 | 28.6 | o | Present Steel |
| AG | 0.002 | 0.0659 | V: 0.12, B: 0.006 | 30.4 | o | Present Steel |
| AH | 0.001 | 0.0153 | V: 0.27, Ta: 0.22 | 26.2 | o | Present Steel |
| AI | 0.003 | 0.0954 | V: 0.91, Ca: 0.008 | 30.2 | o | Present Steel |
| AJ | 0.002 | 0.0867 | W: 0.11, Nb: 0.07 | 32.2 | o | Present Steel |
| AK | 0.002 | 0.0239 | W: 0.31, Co: 1.35 | 21.7 | o | Present Steel |

(*1) The balance is Fe and incidental impurities
(*2) Underline means outside of the range of the present invention
(*3) Formula (1): $13.0 \leq -5.9 \times (7.82 + 27C - 0.91Si + 0.21Mn - 0.9Cr + Ni - 1.1Mo + 0.2Cu + 11N) \leq 55.0$

TABLE 1-2

| Steel No. | Composition (mass %) | | | | | | | | | | |
|---|---|---|---|---|---|---|---|---|---|---|---|
| | C | Si | Mn | P | S | Cr | Mo | Cu | Ni | Al | N |
| AL | 0.012 | 0.22 | 0.184 | 0.016 | 0.0011 | 17.41 | 2.56 | 2.66 | 4.78 | 0.029 | 0.021 |
| AM | 0.012 | 0.25 | 0.408 | 0.014 | 0.0012 | 16.79 | 2.45 | 2.45 | 4.37 | 0.025 | 0.016 |
| AN | 0.065 | 0.33 | 0.248 | 0.015 | 0.0015 | 17.19 | 3.00 | 2.67 | 4.98 | 0.027 | 0.012 |
| AO | 0.008 | 1.28 | 0.302 | 0.015 | 0.0006 | 16.51 | 3.15 | 1.98 | 4.34 | 0.024 | 0.016 |
| AP | 0.014 | 0.29 | 0.289 | 0.055 | 0.0012 | 16.53 | 2.77 | 1.83 | 5.17 | 0.027 | 0.020 |
| AQ | 0.014 | 0.29 | 0.330 | 0.016 | 0.0058 | 16.60 | 2.65 | 2.58 | 4.63 | 0.028 | 0.021 |
| AR | 0.017 | 0.28 | 0.402 | 0.016 | 0.0014 | 18.13 | 3.24 | 3.12 | 4.64 | 0.027 | 0.014 |
| AS | 0.012 | 0.28 | 0.294 | 0.017 | 0.0009 | 15.02 | 2.66 | 2.08 | 4.77 | 0.027 | 0.018 |
| AT | 0.014 | 0.30 | 0.280 | 0.017 | 0.0007 | 17.36 | 4.41 | 2.55 | 4.30 | 0.023 | 0.017 |
| AU | 0.009 | 0.25 | 0.364 | 0.014 | 0.0010 | 16.50 | 1.37 | 1.93 | 5.23 | 0.024 | 0.014 |
| AV | 0.014 | 0.32 | 0.330 | 0.016 | 0.0010 | 16.85 | 2.99 | 1.03 | 5.40 | 0.027 | 0.021 |
| AW | 0.014 | 0.30 | 0.297 | 0.015 | 0.0012 | 17.36 | 2.70 | 3.16 | 6.17 | 0.024 | 0.014 |
| AX | 0.016 | 0.35 | 0.351 | 0.018 | 0.0012 | 17.10 | 2.55 | 2.10 | 2.86 | 0.026 | 0.017 |
| AY | 0.011 | 0.26 | 0.388 | 0.013 | 0.0008 | 16.64 | 2.51 | 3.08 | 5.14 | 0.131 | 0.013 |
| AZ | 0.012 | 0.26 | 0.262 | 0.017 | 0.0011 | 17.04 | 2.76 | 1.84 | 4.41 | 0.028 | 0.115 |
| BA | 0.014 | 0.36 | 0.274 | 0.016 | 0.0013 | 16.60 | 2.44 | 2.43 | 4.58 | 0.025 | 0.014 |
| BB | 0.005 | 0.32 | 0.359 | 0.014 | 0.0010 | 16.62 | 2.25 | 3.07 | 4.67 | 0.025 | 0.014 |
| BC | 0.004 | 0.92 | 0.299 | 0.017 | 0.0014 | 17.73 | 4.00 | 1.80 | 4.13 | 0.019 | 0.014 |
| BD | 0.014 | 0.28 | 0.351 | 0.017 | 0.0014 | 16.01 | 2.54 | 2.45 | 4.98 | 0.027 | 0.017 |
| BE | 0.014 | 0.28 | 0.388 | 0.014 | 0.0009 | 16.63 | 2.55 | 2.67 | 4.34 | 0.024 | 0.014 |
| BF | 0.016 | 0.30 | 0.262 | 0.016 | 0.0011 | 16.55 | 2.53 | 2.12 | 5.17 | 0.027 | 0.021 |
| BG | 0.011 | 0.25 | 0.274 | 0.015 | 0.0007 | 18.61 | 2.80 | 2.04 | 4.63 | 0.028 | 0.014 |
| BH | 0.012 | 0.32 | 0.359 | 0.018 | 0.0014 | 17.02 | 3.23 | 2.73 | 6.69 | 0.027 | 0.017 |
| BI | 0.005 | 0.90 | 0.299 | 0.013 | 0.0011 | 17.89 | 3.89 | 1.38 | 3.31 | 0.027 | 0.013 |

| Steel No. | Composition (mass %) | | | Formula (1) (*3) Middle value | Result | Remarks |
|---|---|---|---|---|---|---|
| | O | Sb | Other | | | |
| AL | 0.003 | 0.0496 | W: 0.42, REM: 0.21 | 29.3 | o | Present Steel |
| AM | 0.003 | 0.0781 | V: 0.33, W: 0.33, B: 0.006, Ti: 0.21, Ca: 0.007 | 28.1 | o | Present Steel |
| AN | 0.002 | 0.0202 | | 22.4 | o | Comparative Example |
| AO | 0.003 | 0.0084 | | 38.2 | o | Comparative Example |
| AP | 0.002 | 0.0427 | | 24.6 | o | Comparative Example |
| AQ | 0.003 | 0.0966 | | 26.4 | o | Comparative Example |
| AR | 0.003 | 0.0496 | | 37.5 | o | Present Steel |
| AS | 0.003 | 0.0962 | | 18.3 | o | Comparative Example |

TABLE 1-2-continued

| | | | | | | |
|---|---|---|---|---|---|---|
| AT | 0.003 | 0.0226 | | 44.2 | o | Comparative Example |
| AU | 0.003 | 0.0640 | | 15.8 | o | Comparative Example |
| AV | 0.002 | 0.0663 | | 27.4 | o | Comparative Example |
| AW | 0.003 | 0.0997 | | 21.5 | o | Present Steel |
| AX | 0.004 | 0.0100 | | 39.7 | o | Comparative Example |
| AY | 0.003 | 0.0988 | | 22.9 | o | Comparative Example |
| AZ | 0.001 | 0.0455 | | 25.8 | o | Comparative Example |
| BA | <u>0.013</u> | 0.0087 | | 26.4 | o | Comparative Example |
| BB | 0.004 | <u>0.0004</u> | | 25.1 | o | Comparative Example |
| BC | 0.002 | 0.0131 | | 50.5 | o | Present Steel |
| BD | 0.002 | 0.0137 | Ca: 0.0028 | 20.8 | o | Present Steel |
| BE | 0.003 | 0.0235 | Ca: 0.0079 | 27.8 | o | Present Steel |
| BF | 0.002 | 0.0073 | Ca: 0.0043 | 22.5 | o | Present Steel |
| BG | 0.003 | 0.0183 | | 39.5 | o | Comparative Example |
| BH | 0.002 | 0.0292 | | 20.8 | o | Comparative Example |
| BI | 0.002 | 0.0125 | | <u>55.8</u> | x | Comparative Example |

(*1) The balance is Fe and incidental impurities
(*2) Underline means outside of the range of the present invention
(*3) Formula (1): $13.0 \leq -5.9 \times (7.82 + 27C - 0.91Si + 0.21Mn - 0.9Cr + Ni - 1.1Mo + 0.2Cu + 11N) \leq 55.0$ A test specimen was taken from the heat-treated test specimen material (seamless steel pipe), and was subjected to microstructure observation, a tensile test, a corrosion resistance test, and a Charpy impact test. The test methods are as follows.

(1) Microstructure Observation

A test specimen for microstructure observation was taken from the heat-treated test material in such an orientation that an axial plane section was exposed for observation. The test specimen for microstructure observation was corroded with a Vilella's reagent (a mixed reagent containing at a rate of 2 g of picric acid, 10 ml of hydrochloric acid, and 100 ml of ethanol), and the structure was imaged with a scanning electron microscope (1,000 times magnification). The fraction (area ratio (%)) of the ferrite phase microstructure was then calculated with an image analyzer. Here, the area ratio was calculated as the volume ratio (%) of the ferrite phase.

Separately, an X-ray diffraction test specimen was taken from the heat-treated test material. The test specimen was ground and polished to have a measurement cross section (C cross section) orthogonal to the axial direction of pipe, and the fraction of the retained austenite (γ) phase microstructure was measured by an X-ray diffraction method. The fraction of the retained austenite phase microstructure was determined by measuring X-ray diffraction integral intensity for the (220) plane of the austenite phase (γ), and the (211) plane of the ferrite phase (α), and converting the calculated values using the following formula.

$$\gamma(\text{volume ratio}) = 100/(1+(I\alpha R\gamma/I\gamma R\alpha)),$$

wherein Iα is the integral intensity of α, Rα is the crystallographic theoretical value for α, Iγ is the integral intensity of γ, and Rγ is the crystallographic theoretical value for γ.

The fraction of the martensitic phase is the remainder other than the fractions of the ferrite phase and retained γ phase.

(2) Tensile Test

An API (American Petroleum Institute) arc-shaped tensile test specimen was taken from the heat-treated test material in such an orientation that the test specimen had a tensile direction along the pipe axis direction. The tensile test was conducted according to the API specifications to determine tensile properties (yield strength YS). Here, the steel was determined as being high strength and acceptable when it had a yield strength YS of 758 MPa or more, and unacceptable when it had a yield strength YS of less than 758 MPa.

(3) Corrosion Resistance Test (Carbon Dioxide Gas Corrosion Resistance Test and Sulfide Stress Cracking Resistance Test)

A corrosion test specimen measuring 3 mm in thickness, 30 mm in width, and 40 mm in length was prepared from the heat-treated test material by machining, and was subjected to a corrosion test to evaluate carbon dioxide gas corrosion resistance.

The corrosion test for evaluation of carbon dioxide gas corrosion resistance was conducted by immersing the corrosion test specimen for 14 days (336 hours) in a test solution (a 20 mass % NaCl aqueous solution; liquid temperature: 200° C.; an atmosphere of 30 atm $CO_2$ gas) kept in an autoclave. The corrosion rate was determined from the calculated reduction in the weight of the tested specimen measured before and after the corrosion test. Here, the steel was determined as being acceptable when it had a corrosion rate of 0.127 mm/y or less, and unacceptable when it had a corrosion rate of more than 0.127 mm/y.

The corrosion test for evaluation of acid-environment corrosion resistance was conducted by immersing the test specimen in an 80° C. 15 mass % hydrochloric acid solution for 40 minutes. The corrosion rate was determined from the calculated reduction in the weight of the tested specimen measured before and after the corrosion test. Here, the steel was determined as being acceptable when it had a corrosion rate of 600 mm/y or less, and unacceptable when it had a corrosion rate of more than 600 mm/y.

A round-rod test specimen (3.81 mm in diameter) was prepared from the test specimen material by machining, and was subjected to a sulfide stress cracking resistance test (SSC (Sulfide Stress Cracking) resistance test).

As a SSC resistance test, an RLT test was conducted that applies stress between 100% and 80% of the yield stress to a test specimen by repeatedly increasing and decreasing applied stress with a strain rate of $1\times10^{-6}$ and a strain rate of $5\times10^{-6}$, respectively, for 1 week in a test solution kept in an autoclave. (The test solution is an aqueous solution prepared by adding acetic acid and sodium acetate to a 25° C. 0.165 mass % NaCl aqueous solution in an atmosphere of 0.99 atm $CO_2$ gas and 0.01 atm $H_2S$, and adjusting the pH to 3.0). After the test, the test specimen was observed for the presence or absence of cracking. The test specimen was determined as having passed the test when it did not have a crack (indicated by "○" in Table 2-1 and Table 2-2), and having failed the test when it had a crack (indicate by "x" in Table 2-1 and Table 2-2).

(4) Charpy Impact Test

A Charpy impact test was conducted for a V-notch test specimen (10-mm thick) taken from the steel pipe in such an orientation that the longitudinal axis of the test specimen was along the pipe axis, in compliance with the JIS Z 2242 specifications. Here, the steel was determined as being acceptable when it had an absorption energy $vE_{-40}$ at −40° C. (test temperature) of 200 J or more.

The results are presented in Table 2-1 and Table 2-2.

TABLE 2-1

| Steel No. | Steel Pipe No. | Quenching | | Tempering | | Microstructure (volume %) | | | Yield strength | | Corrosion | SSC | Corrosion rate in acid | Remarks |
| | | Quenching temp. (° C.) | Quenching time (min) | Tempering temp. (° C.) | Tempering time (min) | M (*1) | F (*1) | A (*1) | YS (MPa) | $vE_{-40}$ (J) | rate (mm/y) | resistance | environment (mm/y) | |
|---|---|---|---|---|---|---|---|---|---|---|---|---|---|---|
| A | 1 | 960 | 20 | 575 | 20 | 53 | 34 | 13 | 929 | 215 | 0.028 | ○ | 560.6 | Present Steel |
| B | 2 | 960 | 20 | 575 | 20 | 58 | 31 | 11 | 944 | 214 | 0.026 | ○ | 548.0 | Present Steel |
| C | 3 | 960 | 20 | 575 | 20 | 50 | 32 | 18 | 915 | 216 | 0.025 | ○ | 547.3 | Present Steel |
| D | 4 | 960 | 20 | 575 | 20 | 44 | 29 | 27 | 880 | 230 | 0.106 | ○ | 583.2 | Present Steel |
| E | 5 | 960 | 20 | 575 | 20 | 57 | 32 | 11 | 935 | 217 | 0.058 | ○ | 572.5 | Present Steel |
| F | 6 | 960 | 20 | 575 | 20 | 61 | 30 | 9 | 961 | 210 | 0.027 | ○ | 559.4 | Present Steel |
| G | 7 | 960 | 20 | 575 | 20 | 60 | 33 | 7 | 951 | 207 | 0.025 | ○ | 554.6 | Present Steel |
| H | 8 | 960 | 20 | 575 | 20 | 62 | 30 | 8 | 948 | 208 | 0.079 | ○ | 573.9 | Present Steel |
| I | 9 | 960 | 20 | 575 | 20 | 60 | 32 | 8 | 956 | 212 | 0.025 | ○ | 581.0 | Present Steel |
| J | 10 | 960 | 20 | 575 | 20 | 47 | 32 | 21 | 893 | 217 | 0.022 | ○ | 540.2 | Present Steel |
| K | 11 | 960 | 20 | 575 | 20 | 70 | 24 | 6 | 996 | 203 | 0.098 | ○ | 567.2 | Present Steel |
| L | 12 | 960 | 20 | 575 | 20 | 42 | 34 | 24 | 870 | 202 | 0.021 | ○ | 548.0 | Present Steel |
| M | 13 | 960 | 20 | 575 | 20 | 61 | 28 | 11 | 959 | 225 | 0.079 | ○ | 559.1 | Present Steel |
| N | 14 | 960 | 20 | 575 | 20 | 56 | 32 | 12 | 936 | 209 | 0.016 | ○ | 543.9 | Present Steel |
| O | 15 | 960 | 20 | 575 | 20 | 62 | 34 | 4 | 937 | 204 | 0.037 | ○ | 576.6 | Present Steel |
| P | 16 | 960 | 20 | 575 | 20 | 50 | 31 | 19 | 914 | 240 | 0.023 | ○ | 559.4 | Present Steel |
| Q | 17 | 960 | 20 | 575 | 20 | 53 | 34 | 13 | 927 | 207 | 0.031 | ○ | 554.6 | Present Steel |
| T | 18 | 960 | 20 | 575 | 20 | 56 | 30 | 14 | 936 | 214 | 0.062 | ○ | 561.4 | Present Steel |
| U | 19 | 960 | 20 | 575 | 20 | 53 | 28 | 19 | 923 | 218 | 0.069 | ○ | 574.2 | Present Steel |
| V | 20 | 960 | 20 | 575 | 20 | 53 | 31 | 16 | 924 | 216 | 0.070 | ○ | 568.2 | Present Steel |
| W | 21 | 960 | 20 | 575 | 20 | 60 | 27 | 13 | 944 | 213 | 0.028 | ○ | 527.3 | Present Steel |
| X | 22 | 960 | 20 | 575 | 20 | 61 | 28 | 11 | 947 | 216 | 0.036 | ○ | 593.1 | Present Steel |
| Y | 23 | 960 | 20 | 575 | 20 | 40 | 47 | 13 | 875 | 212 | 0.027 | ○ | 548.0 | Present Steel |
| Z | 24 | 960 | 20 | 575 | 20 | 69 | 24 | 7 | 991 | 206 | 0.025 | ○ | 547.3 | Present Steel |
| AA | 25 | 960 | 20 | 575 | 20 | 58 | 31 | 11 | 947 | 214 | 0.027 | ○ | 557.2 | Present Steel |

TABLE 2-1-continued

| | | Quenching | | Tempering | | | | | Yield strength | | | | Corrosion rate | |
| | | Quench-ing | Quench-ing | Tem-pering | Tem-pering | Microstructure (volume %) | | | | | Corrosion | SSC | in acid | |
| Steel No. | Steel Pipe No. | temp. (°C.) | time (min) | temp. (°C.) | time (min) | M (*1) | F (*1) | A (*1) | YS (MPa) | vE$_{-40}$ (J) | rate (mm/y) | resis-tance | environment (mm/y) | Remarks |
|---|---|---|---|---|---|---|---|---|---|---|---|---|---|---|
| AB | 26 | 960 | 20 | 575 | 20 | 63 | 31 | 6 | 963 | 203 | 0.031 | ○ | 563.0 | Present Steel |
| AC | 27 | 960 | 20 | 575 | 20 | 56 | 33 | 11 | 945 | 208 | 0.031 | ○ | 559.4 | Present Steel |
| AD | 28 | 960 | 20 | 575 | 20 | 52 | 31 | 17 | 919 | 218 | 0.026 | ○ | 554.6 | Present Steel |
| AE | 29 | 960 | 20 | 575 | 20 | 46 | 36 | 18 | 901 | 217 | 0.024 | ○ | 551.0 | Present Steel |
| AF | 30 | 960 | 20 | 575 | 20 | 56 | 30 | 14 | 928 | 206 | 0.027 | ○ | 560.6 | Present Steel |
| AG | 31 | 960 | 20 | 575 | 20 | 62 | 31 | 7 | 954 | 206 | 0.024 | ○ | 557.1 | Present Steel |
| AH | 32 | 960 | 20 | 575 | 20 | 55 | 33 | 12 | 936 | 210 | 0.027 | ○ | 560.6 | Present Steel |
| AI | 33 | 960 | 20 | 575 | 20 | 52 | 33 | 15 | 923 | 212 | 0.025 | ○ | 548.0 | Present Steel |
| AJ | 34 | 960 | 20 | 575 | 20 | 55 | 31 | 14 | 918 | 205 | 0.023 | ○ | 547.3 | Present Steel |
| AK | 35 | 960 | 20 | 575 | 20 | 55 | 31 | 14 | 936 | 202 | 0.027 | ○ | 557.2 | Present Steel |

Underline means outside of the range of the present invention
(*1) M: Martensitic phase, F: Ferrite phase, A: Retained austenite phase

TABLE 2-2

| | | Quenching | | Tempering | | | | | Yield strength | | | | Corrosion rate | |
| | | Quench-ing | Quench-ing | Tem-pering | Tem-pering | Microstructure (volume %) | | | | | Corrosion | SSC | in acid | |
| Steel No. | Steel Pipe No. | temp. (°C.) | time (min) | temp. (°C.) | time (min) | M (*1) | F (*1) | A (*1) | YS (MPa) | vE$_{-40}$ (J) | rate (mm/y) | resis-tance | environment (mm/y) | Remarks |
|---|---|---|---|---|---|---|---|---|---|---|---|---|---|---|
| AL | 36 | 960 | 20 | 575 | 20 | 51 | 32 | 17 | 922 | 207 | 0.024 | ○ | 563.0 | Present Steel |
| AM | 37 | 960 | 20 | 575 | 20 | 58 | 33 | 9 | 945 | 201 | 0.026 | ○ | 559.4 | Present Steel |
| AN | 38 | 960 | 20 | 575 | 20 | 42 | 28 | 30 | 869 | 234 | 0.136 | x | 609.1 | Comparative Example |
| AO | 39 | 960 | 20 | 575 | 20 | 56 | 34 | 10 | 932 | 211 | 0.138 | x | 605.3 | Comparative Example |
| AP | 40 | 960 | 20 | 575 | 20 | 62 | 28 | 10 | 946 | 211 | 0.138 | x | 608.1 | Comparative Example |
| AQ | 41 | 960 | 20 | 575 | 20 | 60 | 31 | 9 | 940 | 214 | 0.151 | x | 607.6 | Comparative Example |
| AR | 42 | 960 | 20 | 575 | 20 | 37 | 37 | 26 | 846 | 228 | 0.018 | ○ | 563.0 | Present Steel |
| AS | 43 | 960 | 20 | 575 | 20 | 71 | 25 | 4 | 997 | 205 | 0.151 | x | 612.2 | Comparative Example |
| AT | 44 | 960 | 20 | 575 | 20 | 42 | 36 | 22 | 867 | 179 | 0.028 | ○ | 557.2 | Comparative Example |
| AU | 45 | 960 | 20 | 575 | 20 | 70 | 24 | 6 | 991 | 205 | 0.140 | x | 609.0 | Comparative Example |
| AV | 46 | 960 | 20 | 575 | 20 | 55 | 30 | 15 | 872 | 215 | 0.154 | x | 608.6 | Comparative Example |
| AW | 47 | 960 | 20 | 575 | 20 | 36 | 31 | 33 | 838 | 236 | 0.026 | ○ | 557.2 | Present Steel |
| AX | 48 | 960 | 20 | 575 | 20 | 57 | 32 | 11 | 939 | 178 | 0.026 | ○ | 563.0 | Comparative Example |
| AY | 49 | 960 | 20 | 575 | 20 | 54 | 31 | 15 | 942 | 211 | 0.144 | x | 602.7 | Comparative Example |
| AZ | 50 | 960 | 20 | 575 | 20 | 53 | 29 | 18 | 909 | 221 | 0.159 | x | 601.9 | Comparative Example |
| BA | 51 | 960 | 20 | 575 | 20 | 60 | 29 | 11 | 947 | 212 | 0.152 | x | 603.8 | Comparative Example |
| BB | 52 | 960 | 20 | 575 | 20 | 58 | 31 | 11 | 949 | 210 | 0.137 | x | 601.1 | Comparative Example |
| BC | 53 | 960 | 20 | 575 | 20 | 30 | 61 | 9 | 832 | 220 | 0.028 | ○ | 557.2 | Present Steel |

TABLE 2-2-continued

| Steel No. | Steel Pipe No. | Quenching Quench-ing temp. (° C.) | Quenching Quench-ing time (min) | Tempering Tem-pering temp. (° C.) | Tempering Tem-pering time (min) | Microstructure (volume %) M (*1) | Microstructure (volume %) F (*1) | Microstructure (volume %) A (*1) | Yield strength YS (MPa) | vE−40 (J) | Corrosion rate (mm/y) | SSC resis-tance | Corrosion rate in acid environment (mm/y) | Remarks |
|---|---|---|---|---|---|---|---|---|---|---|---|---|---|---|
| A | 54 | 960 | 20 | 620 | 20 | 35 | 32 | 33 | 840 | 231 | 0.025 | ○ | 563.1 | Present Steel |
| B | 55 | 960 | 20 | 620 | 20 | 39 | 31 | 30 | 827 | 225 | 0.030 | ○ | 568.3 | Present Steel |
| C | 56 | 960 | 20 | 620 | 20 | 36 | 31 | 33 | 805 | 232 | 0.023 | ○ | 573.1 | Present Steel |
| BD | 57 | 960 | 20 | 575 | 20 | 55 | 30 | 15 | 938 | 211 | 0.030 | ○ | 569.2 | Present Steel |
| BE | 58 | 960 | 20 | 575 | 20 | 57 | 31 | 12 | 920 | 209 | 0.030 | ○ | 573.1 | Present Steel |
| BF | 59 | 960 | 20 | 575 | 20 | 56 | 28 | 16 | 915 | 220 | 0.025 | ○ | 579.1 | Present Steel |
| BD | 60 | 960 | 20 | 620 | 20 | 37 | 32 | 31 | 850 | 222 | 0.029 | ○ | 563.4 | Present Steel |
| BE | 61 | 960 | 20 | 620 | 20 | 38 | 32 | 30 | 835 | 230 | 0.033 | ○ | 561.3 | Present Steel |
| BF | 62 | 960 | 20 | 620 | 20 | 39 | 28 | 33 | 839 | 231 | 0.025 | ○ | 569.0 | Present Steel |
| BG | 63 | 960 | 20 | 575 | 20 | <u>29</u> | 49 | 22 | <u>715</u> | 203 | 0.019 | ○ | 557.2 | Comparative Example |
| BH | 64 | 960 | 20 | 575 | 20 | <u>26</u> | 28 | <u>46</u> | <u>707</u> | 230 | 0.035 | ○ | 566.5 | Comparative Example |
| BI | 65 | 960 | 20 | 575 | 20 | <u>8</u> | 65 | 27 | <u>627</u> | 202 | 0.025 | ○ | 567.2 | Comparative Example |
| A | 66 | <u>800</u> | 20 | 575 | 20 | 36 | 22 | <u>42</u> | <u>618</u> | 202 | 0.029 | ○ | 570.3 | Comparative Example |
| A | 67 | <u>1200</u> | 20 | 575 | 20 | <u>23</u> | 62 | 15 | <u>670</u> | 13 | 0.027 | ○ | 572.1 | Comparative Example |
| A | 68 | 960 | 10 | 575 | 20 | 53 | 31 | 16 | 905 | 219 | 0.028 | ○ | 569.8 | Present Steel |
| A | 69 | 960 | 30 | 575 | 20 | 54 | 33 | 13 | 924 | 220 | 0.027 | ○ | 567.8 | Present Steel |
| A | 70 | 960 | 20 | 575 | 10 | 60 | 30 | 10 | 976 | 213 | 0.030 | ○ | 573.8 | Present Steel |
| A | 71 | 960 | 20 | 575 | 80 | 55 | 29 | 16 | 870 | 229 | 0.029 | ○ | 566.6 | Present Steel |

Underline means outside of the range of the present invention
(*1) M: Martensitic phase, F: Ferrite phase, A: Retained austenite phase As shown in Table 2-1 and Table 2-2, the stainless steel seamless pipes of the present examples all had high strength with a yield strength, YS, of 758 MPa or more. The stainless steel seamless pipes of the present examples also had excellent corrosion resistance (carbon dioxide gas corrosion resistance) in a $CO_2$- and $Cl^-$-containing high-temperature corrosive environment of 200° C., and excellent sulfide stress cracking resistance. The low-temperature toughness was also desirable.

The invention claimed is:

1. A stainless steel seamless pipe having a composition that consists of, in mass %, C: 0.06% or less, Si: 1.0% or less, Mn: 0.01% or more and 1.0% or less, P: 0.05% or less, S: 0.005% or less, Cr: 15.2% or more and 18.5% or less, Mo: 1.5% or more and 4.3% or less, Cu: 1.1% or more and 3.5% or less, Ni: 3.0% or more and 6.5% or less, Al: 0.10% or less, N: 0.10% or less, O: 0.010% or less, Sb: 0.001% or more and 1.000% or less, V: 1.0% or less, W: 0.9% or less, Nb: 0.30% or less, B: 0.01% or less, Ta: 0.3% or less, Co: 1.5% or less, Ti: 0.3% or less, Zr: 0.3% or less, Ca: 0.01% or less, REM: 0.3% or less, Mg: 0.01% or less, and Sn: 1.0% or less, and in which C, Si, Mn, Cr, Ni, Mo, Cu, and N satisfy the following formula (1), and the balance is Fe and incidental impurities, the stainless steel seamless pipe having a microstructure containing 30% or more martensitic phase, 65% or less ferrite phase, and 40% or less retained austenite phase by volume, the stainless steel seamless pipe having a yield strength of 758 MPa or more, the stainless steel seamless pipe having an absorption energy vE-40 of 200 J or more, as measured at −40° C. in a Charpy impact test conducted for a 10-mm thick V-notch test specimen taken from a steel pipe in such an orientation that a longitudinal axis of the test specimen is along the pipe axis, in compliance with the Japanese Industrial Standard Z 2242 (2018) specifications, $$13.0 \leq -5.9 \times (7.82 + 27C - 0.91Si + 0.21Mn - 0.9Cr + Ni - 1.1Mo + 0.2Cu + 11N) \leq 55.0 \quad (1),$$

wherein C, Si, Mn, Cr, Ni, Mo, Cu, and N represent the content of each element in mass %, and the content is zero for elements that are not contained.

2. A stainless steel seamless pipe having a composition that consists of, in mass %, C: 0.06% or less, Si: 1.0% or less, Mn: 0.01% or more and 1.0% or less, P: 0.05% or less, S: 0.005% or less, Cr: 15.2% or more and 18.5% or less, Mo: 1.5% or more and 4.3% or less, Cu: 1.1% or more and 3.5% or less, Ni: 3.0% or more and 6.5% or less, Al: 0.10% or less, N: 0.10% or less, O: 0.010% or less, and Sb: 0.001% or more and 1.000% or less, V: 1.0% or less, W: 0.9% or less, Nb: 0.30% or less, B: 0.01% or less, Ta: 0.3% or less, Co: 1.5% or less, Ti: 0.3% or less, Zr: 0.3% or less, Ca: 0.01% or less, REM: 0.3% or less, Mg: 0.01% or less, and Sn: 1.0% or less, and in which C, Si, Mn, Cr, Ni, Mo, Cu, and N satisfy the following formula (1), and the balance is Fe and incidental impurities, the stainless steel seamless pipe having a microstructure containing 40% or more martensitic phase, 60% or less ferrite phase, and 30% or less retained austenite phase by volume, the stainless steel seamless pipe having a yield strength of 862 MPa or more, the stainless steel seamless pipe having an absorption energy vE-40 of 200 J or more, as measured at −40° C. in a Charpy impact test conducted for a 10-mm thick V-notch test specimen taken from a steel pipe in such an orientation that a longitudinal axis of the test specimen is along the pipe axis, in compliance with the Japanese Industrial Standard Z 2242 (2018) specifications, $$13.0 \leq -5.9 \times (7.82+27C-0.91Si+0.21Mn-0.9Cr+Ni-1.1Mo+0.2Cu+11N) \leq 55.0 \quad (1),$$

wherein C, Si, Mn, Cr, Ni, Mo, Cu, and N represent the content of each element in mass %, and the content is zero for elements that are not contained.

3. The stainless steel seamless pipe according to claim 2, wherein the Cr content is 15.2% or more and 18.0% or less, and the Ni content is 3.0% or more and 6.0% or less, and the composition satisfies the following formula (1)', $$13.0 \leq -5.9 \times (7.82+27C-0.91Si+0.21Mn-0.9Cr+Ni-1.1Mo+0.2Cu+11N) \leq 50.0 \quad (1)',$$

wherein C, Si, Mn, Cr, Ni, Mo, Cu, and N represent the content of each element in mass %, and the content is zero for elements that are not contained.

4. A method for manufacturing a stainless steel seamless pipe of claim 1, the method comprising:

hot working a steel pipe material of said composition into a seamless steel pipe;

quenching that reheats the seamless steel pipe to a temperature of 850 to 1,150° C., and cools the seamless steel pipe at a cooling rate of air cooling or faster until a pipe surface reaches a cooling stop temperature of 50° C. or less; and tempering that heats the quenched seamless steel pipe to a temperature of 500 to 650° C.

5. A method for manufacturing a stainless steel seamless pipe of claim 2, the method comprising:

hot working a steel pipe material of said composition into a seamless steel pipe;

quenching that reheats the seamless steel pipe to a temperature of 850 to 1,150° C., and cools the seamless steel pipe at a cooling rate of air cooling or faster until a pipe surface reaches a cooling stop temperature of 50° C. or less; and tempering that heats the quenched seamless steel pipe to a temperature of 500 to 650° C.

6. The method for manufacturing the stainless steel seamless pipe according to claim 5, wherein the Cr content is 15.2% or more and 18.0% or less, and the Ni content is 3.0% or more and 6.0% or less, and the composition satisfies the following formula (1)', instead of the formula (1), $$13.0 \leq -5.9 \times (7.82+27C-0.91Si+0.21Mn-0.9Cr+Ni-1.1Mo+0.2Cu+11N) \leq 50.0 \quad (1)',$$

wherein C, Si, Mn, Cr, Ni, Mo, Cu, and N represent the content of each element in mass %, and the content is zero for elements that are not contained.

* * * * *